UNITED STATES PATENT OFFICE.

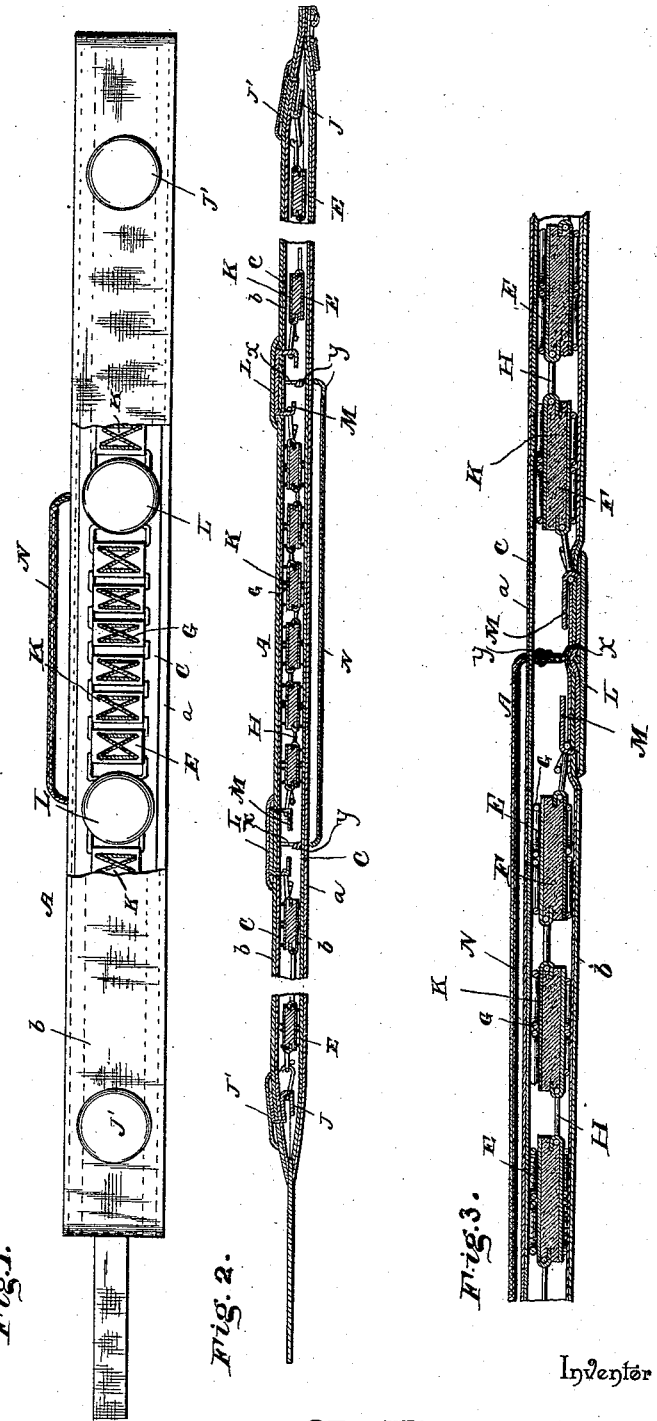

OLE KJORSTAD, OF EAU CLAIRE, WISCONSIN.

ELECTRIC BELT.

SPECIFICATION forming part of Letters Patent No. 488,013, dated December 13, 1892.

Application filed May 11, 1892. Serial No. 432,632. (No model.)

*To all whom it may concern:*

Be it known that I, OLE KJORSTAD, a citizen of the United States, residing at Eau Claire, in the county of Eau Claire and State of Wisconsin, have invented a new and useful Electric Belt, of which the following is a specification.

This invention relates to electric belts; and it has for its object to provide an improved electric belt designed to be worn around the body of a person, so that a continuous flow of electricity may be passed through the body in order to obtain every possible curative result from the application of electricity to the body for the various ailments which electricity is employed to cure, and also to provide means whereby the strength of current can be regulated. To this end it is the main object of the invention to improve upon devices of this character.

With these and many other objects in view, which will readily appear as the nature of the invention is better understood, the same consists in the novel construction, combination, and arrangement of parts hereinafter more fully described, illustrated, and claimed.

In the accompanying drawings, Figure 1 is a plan view, partly in section, of an electric belt constructed in accordance with this invention. Fig. 2 is a horizontal sectional view of the same. Fig. 3 is an enlarged detail sectional view of a portion of the batteries employed.

Referring to the accompanying drawings, A represents a body-belt comprising the outer lining $a$ and the inner chamois or other soft lining $b$, which are sewed together along their lower edges to form a continuous pocket for receiving and accommodating the generating devices located therein, and said outer and inner lining are lined upon their inner sides with a protective lining C, which is of any suitable non-absorbent material which, while allowing the batteries to rest in pocket of the belt, at the same time provides means for preventing the liquid with which the battery is saturated from oozing through the main linings of the belt, said belt being fastened to the body in any suitable manner and adapted to accommodate the battery-sections K. The said batteries K comprise a series of separate and independent connected battery-plates E.

The said battery-plates E are rectangular in shape and are arranged in pairs, with a suitable absorbent insulating substance F clamped between each pair of plates, said plates being clamped together by suitable binding-cord G, passed through and through said plates and the spacing absorbent material between the same. Each pair of battery-plates E comprises a copper and a zinc plate, which are alternately disposed with relation to the plates of the adjacent pairs. The zinc of one pair of battery-plates is connected by the wire loop H with the copper plate of one adjacent pair, while the copper plate of the same pair of battery-plates is connected by a similar connecting wire loop H with the zinc plate of the adjacent pair of plates on the other side, so that it will be readily seen that the said series of battery-plates are connected continuously in circuit with each other, so that the current will pass continuously through the entire series when the proper connections are made. After saturating the battery-sections in a solution of salt and water and the same are placed in the belt and proper connections have been made it will be readily seen that a continuous current of uniform strength must necessarily pass through the line of battery-sections and the human body.

As illustrated, to regulate the strength of the current I employ a series of the battery-sections K independent of but connected in circuit with each other. The said battery-sections K are constructed as described and are made in proper lengths, so as to be arranged in sections within the belt-pocket. The belt is provided with the end contact plates or electrodes J', having the connecting-hooks J and with the intermediate contact electrodes or plates L, each of which is provided with the connecting-hooks M, which receive the connecting-loops at the ends of the intermediate and end battery-sections, as illustrated. The said intermediate electrodes are further provided between the hooks M with the short inwardly-projecting connecting pins or wires $x$, the function of which will be described.

If the current is found to be too strong, any one of the battery-sections K can be removed from the belt and the circuit still left complete, but regulated to the strength desired.

In the event of removing the intermediate battery-section to complete the circuit between the end battery-sections, which otherwise would be left disconnected from each other, I employ the separate intermediate connecting-wire N. As illustrated in the drawings, the connecting-wire is shown attached to the central electrodes ready for the removal of the central battery-section; but it will of course be understood that when the central section is in position the conducting-wire is disconnected from said electrodes, and said wire is detachably connected with the central electrodes in order to secure this result by means of a simple twist-connection $y$ with the short connecting pins or wires $x$ of said electrodes. (Clearly shown in Figs. 2 and 3.)

Thus it will be readily seen that an electric belt is provided which not only provides a continuous and equalized electric current, but also one in which the current may be regulated to suit the exigencies of the particular case.

I claim—

In an electric belt, the combination, with the body-belt having a continuous pocket, of the fixed end and central contact electrodes or plates having connecting-hooks projecting into the pocket, separate battery-sections, each comprising a series of separate pairs of battery-plates and absorbent material between said plates, said pairs of battery-plates being connected in circuit with each other and having at the ends of the battery connecting-loops adapted to removably engage the connecting-hooks of the end and the central contact electrodes or plates, and an intermediate connecting-wire adapted to be removably connected at its ends with the central electrodes or plates to provide for the completion of the circuit between the end battery-sections when the central battery-section is removed, substantially as set forth.

In testimony that I claim the foregoing as my own I have hereto affixed my signature in the presence of two witnesses.

OLE KJORSTAD.

Witnesses:
W. H. FRAWLEY,
L. M. DUNHAM.